US012598096B2

(12) United States Patent
Liu et al.

(10) Patent No.: US 12,598,096 B2
(45) Date of Patent: Apr. 7, 2026

(54) METHOD AND APPARATUS FOR ACCESSING VIRTUAL MACHINE, DEVICE AND STORAGE MEDIUM

(71) Applicant: Guangzhou Duling Technology Co., Ltd., Guangzhou City (CN)

(72) Inventors: Junyun Liu, Guangzhou City (CN); Yongce Tu, Guangzhou City (CN); Jiaxiang Gao, Guangzhou City (CN)

(73) Assignee: GUANGZHOU DULING TECHNOLOGY CO., LTD. (CN)

( * ) Notice: Subject to any disclaimer, the term of this patent is extended or adjusted under 35 U.S.C. 154(b) by 82 days.

(21) Appl. No.: 18/889,525

(22) Filed: Sep. 19, 2024

(65) Prior Publication Data

US 2025/0016028 A1     Jan. 9, 2025

(30) Foreign Application Priority Data

Mar. 27, 2024     (CN) .......................... 202410366177.7

(51) Int. Cl.
*G06F 15/16*          (2006.01)
*G06F 9/54*           (2006.01)
(Continued)

(52) U.S. Cl.
CPC ...... *H04L 12/4641* (2013.01); *H04L 61/2517* (2013.01); *H04L 61/2596* (2013.01)

(58) Field of Classification Search
CPC ............. H04L 12/4641; H04L 61/2517; H04L 61/2596; H04L 61/103; H04L 2101/622;
(Continued)

(56) References Cited

U.S. PATENT DOCUMENTS 9,378,036 B1 *  6/2016  Sarcar ................. H04L 49/3045
10,819,675 B2 * 10/2020  Hira ...................... H04L 47/125
(Continued)

FOREIGN PATENT DOCUMENTS

CN          103167006 A      6/2013
CN          103747020 A      4/2014
(Continued)

OTHER PUBLICATIONS

Notice of Allowance received for Chinese Patent Application No. 202410366177.7, mailed on Nov. 20, 2024, 6 pages (2 pages of English Translation and 4 pages of Original Document).
(Continued)

*Primary Examiner* — Hamza N Algibhah
(74) *Attorney, Agent, or Firm* — Dilworth IP, LLC

(57)          ABSTRACT

The present disclosure provides a method for accessing a virtual machine: applying to a server, the server is deployed with a virtual switch, at least one virtual machine, a physical network interface card interface and a virtual bridge interface, receiving an initial access request through the virtual bridge interface; the initial access request includes first destination address information; translating the first destination address information to second destination address information to obtain a processed access request based on the virtual bridge interface; sending the processed access request to a port of a virtual switch according to the second destination address information based on the virtual bridge interface; translating the second destination address information to third destination address information to obtain a final access request based on the virtual switch; accessing the virtual machine indicated by the initial access request based on the third destination address information in the final access request.

20 Claims, 6 Drawing Sheets

(51) Int. Cl.

| | |
|---|---|
| *H04L 12/46* | (2006.01) |
| *H04L 29/06* | (2006.01) |
| *H04L 61/2517* | (2022.01) |
| *H04L 61/2596* | (2022.01) |

(58) Field of Classification Search

CPC ....... H04L 49/70; H04L 41/40; H04L 49/354; H04L 61/2503; G06F 9/455

USPC .......................................................... 709/245

See application file for complete search history.

(56) References Cited

U.S. PATENT DOCUMENTS

| | | | | |
|---|---|---|---|---|
| 11,153,173 | B1 * | 10/2021 | Rebeja | H04L 61/2503 |
| 2006/0233168 | A1 * | 10/2006 | Lewites | H04L 12/462 |
| | | | | 370/389 |
| 2008/0117909 | A1 * | 5/2008 | Johnson | G06F 13/387 |
| | | | | 370/392 |
| 2009/0265501 | A1 * | 10/2009 | Uehara | G06F 11/2033 |
| | | | | 710/316 |
| 2011/0213937 | A1 * | 9/2011 | Barry | G06F 9/30036 |
| | | | | 711/E12.001 |
| 2014/0123141 | A1 * | 5/2014 | Lee | G06F 9/45533 |
| | | | | 718/1 |
| 2014/0282506 | A1 * | 9/2014 | Cadigan, Jr. | G06F 9/54 |
| | | | | 718/1 |
| 2014/0298330 | A1 * | 10/2014 | Suzuki | G06F 9/45558 |
| | | | | 718/1 |
| 2015/0016287 | A1 * | 1/2015 | Ganichev | H04L 43/10 |
| | | | | 370/252 |
| 2016/0239326 | A1 * | 8/2016 | Kaplan | G06F 9/45533 |
| 2017/0039147 | A1 * | 2/2017 | Amann | G06F 21/6218 |
| 2019/0052598 | A1 * | 2/2019 | Hira | H04L 61/5007 |
| 2019/0068493 | A1 * | 2/2019 | Ram | H04L 45/586 |
| 2019/0173888 | A1 | 6/2019 | Li et al. | |
| 2019/0273683 | A1 * | 9/2019 | Jiang | G06F 9/45558 |
| 2021/0064414 | A1 * | 3/2021 | Lolage | H04L 41/342 |
| 2021/0120076 | A1 * | 4/2021 | Sun | H04L 12/4641 |
| 2023/0300002 | A1 * | 9/2023 | Shen | H04L 47/803 |
| | | | | 709/220 |

FOREIGN PATENT DOCUMENTS

| | | | | | |
|---|---|---|---|---|---|
| CN | 108259642 | A | | 7/2018 | |
| CN | 106953788 | B | * | 12/2019 | ........ H04L 63/0272 |
| CN | 108259642 | B | * | 4/2021 | ........ H04L 61/4535 |
| CN | 114978808 | A | | 8/2022 | |
| CN | 116599900 | A | | 8/2023 | |
| EP | 3493510 | B1 | * | 10/2020 | .......... H04L 61/4511 |
| IN | 201937005167 | A | | 3/2019 | |

OTHER PUBLICATIONS

First Office Action in CN Patent Application No. 202410366177.7 dated Aug. 15, 2024.

Extended European Search Report and Search Opinion received for EP Application No. 24200605.4, mailed on Feb. 12, 2025, 10 pages.

* cited by examiner

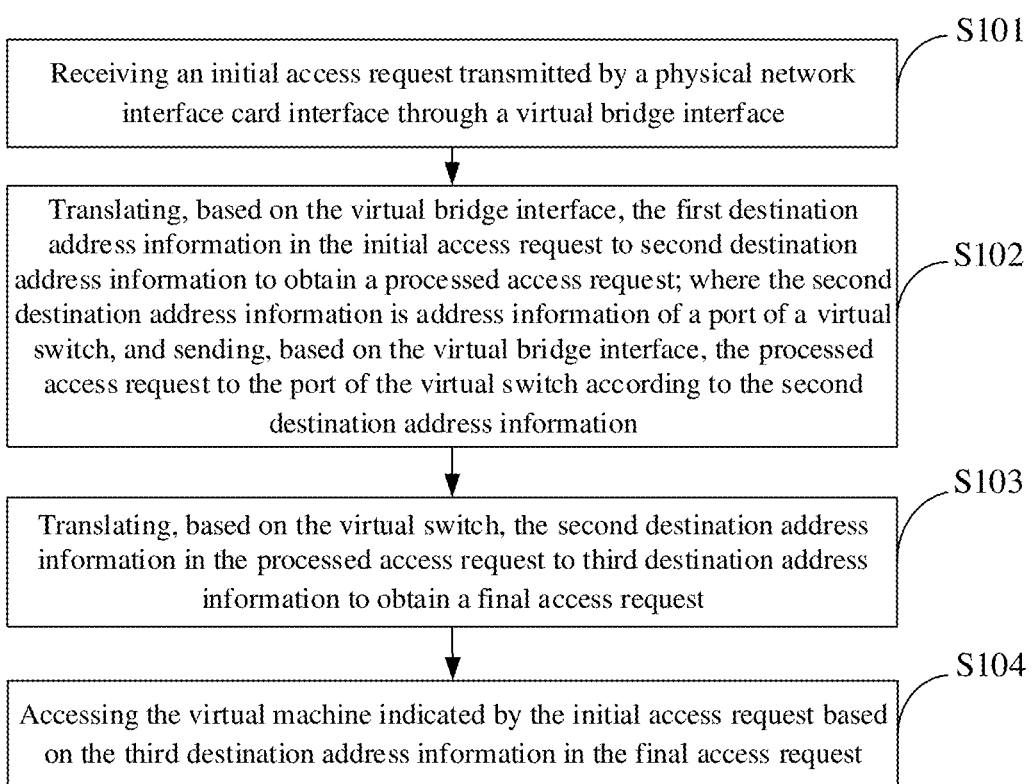

S101

Receiving an initial access request transmitted by a physical network interface card interface through a virtual bridge interface

S102

Translating, based on the virtual bridge interface, the first destination address information in the initial access request to second destination address information to obtain a processed access request; where the second destination address information is address information of a port of a virtual switch, and sending, based on the virtual bridge interface, the processed access request to the port of the virtual switch according to the second destination address information

S103

Translating, based on the virtual switch, the second destination address information in the processed access request to third destination address information to obtain a final access request

S104

Accessing the virtual machine indicated by the initial access request based on the third destination address information in the final access request

FIG. 1

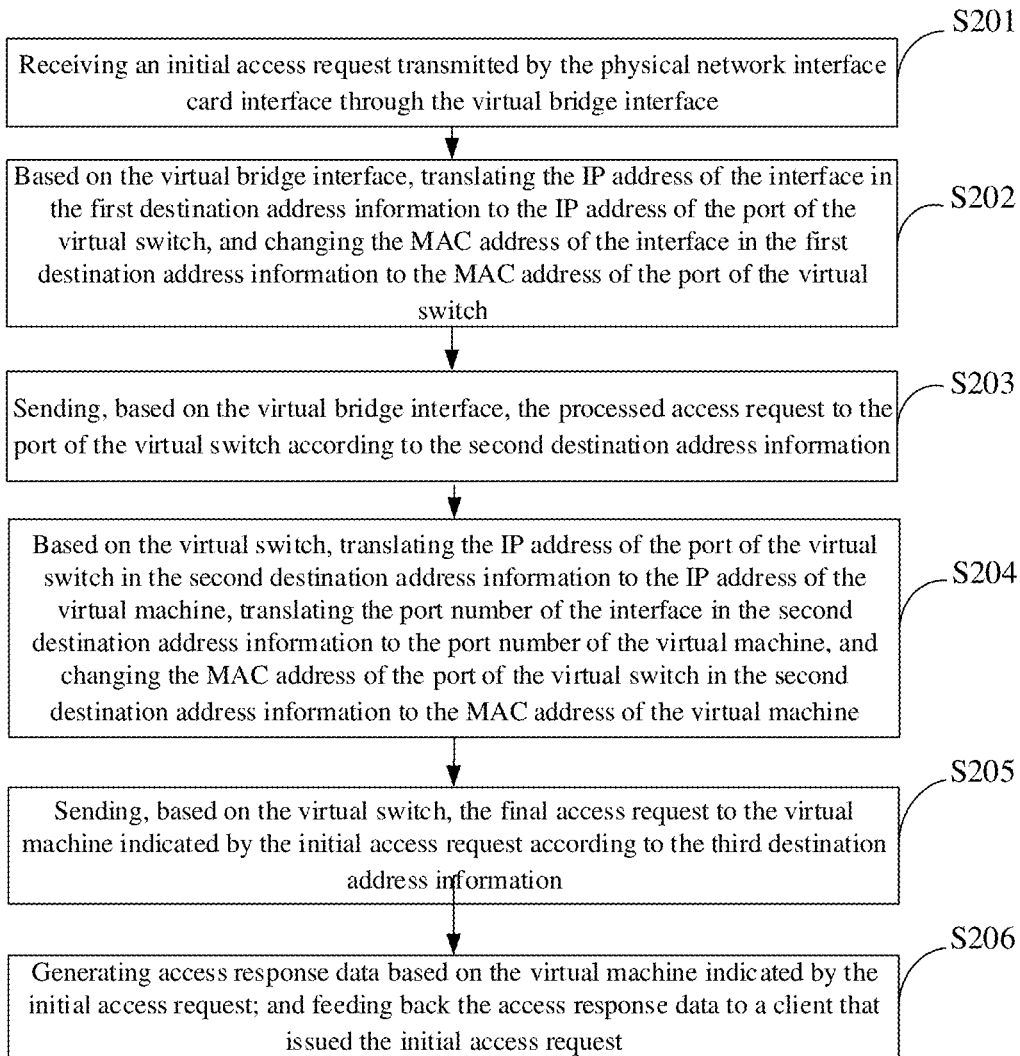

Receiving an initial access request transmitted by the physical network interface card interface through the virtual bridge interface — S201

Based on the virtual bridge interface, translating the IP address of the interface in the first destination address information to the IP address of the port of the virtual switch, and changing the MAC address of the interface in the first destination address information to the MAC address of the port of the virtual switch — S202

Sending, based on the virtual bridge interface, the processed access request to the port of the virtual switch according to the second destination address information — S203

Based on the virtual switch, translating the IP address of the port of the virtual switch in the second destination address information to the IP address of the virtual machine, translating the port number of the interface in the second destination address information to the port number of the virtual machine, and changing the MAC address of the port of the virtual switch in the second destination address information to the MAC address of the virtual machine — S204

Sending, based on the virtual switch, the final access request to the virtual machine indicated by the initial access request according to the third destination address information — S205

Generating access response data based on the virtual machine indicated by the initial access request; and feeding back the access response data to a client that issued the initial access request — S206

FIG. 2

Figure 3:
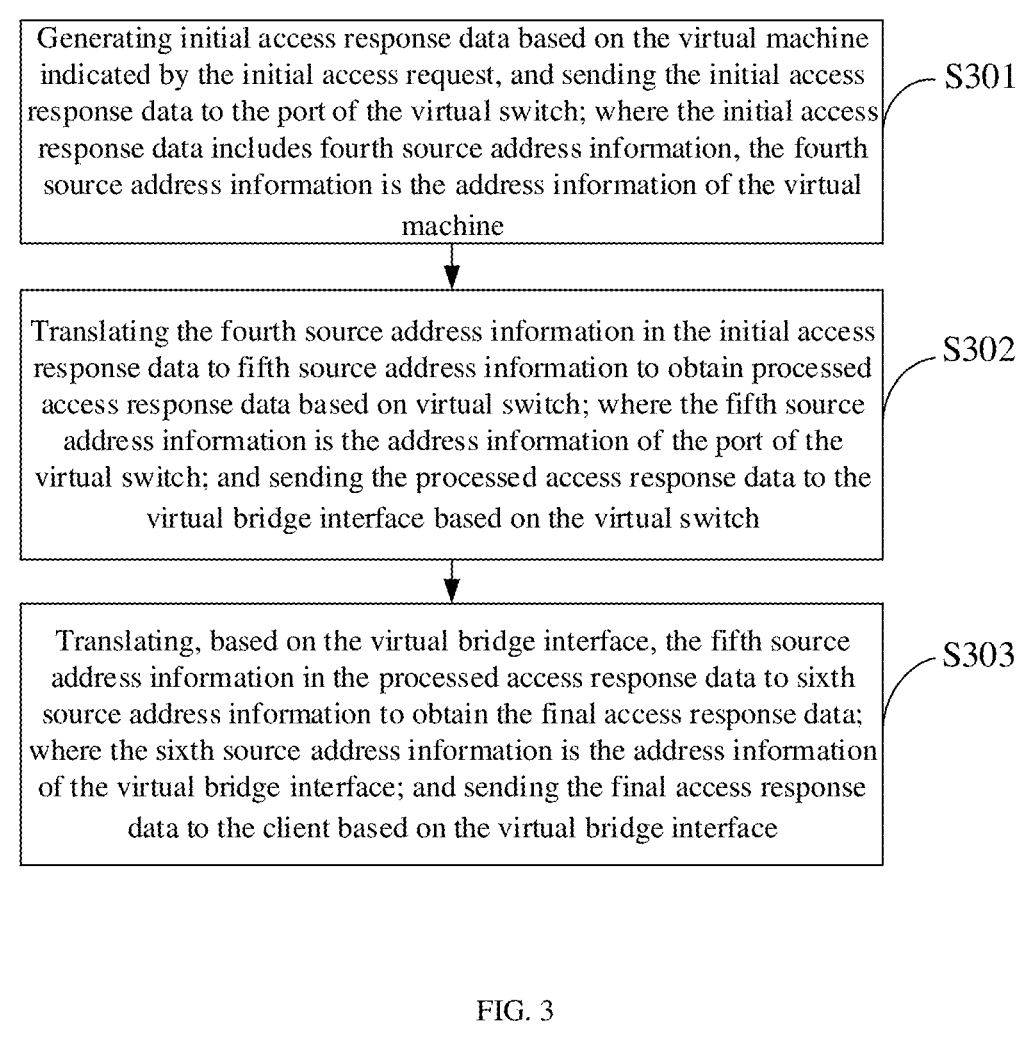

Generating initial access response data based on the virtual machine indicated by the initial access request, and sending the initial access response data to the port of the virtual switch; where the initial access response data includes fourth source address information, the fourth source address information is the address information of the virtual machine

S301

Translating the fourth source address information in the initial access response data to fifth source address information to obtain processed access response data based on virtual switch; where the fifth source address information is the address information of the port of the virtual switch; and sending the processed access response data to the virtual bridge interface based on the virtual switch

S302

Translating, based on the virtual bridge interface, the fifth source address information in the processed access response data to sixth source address information to obtain the final access response data; where the sixth source address information is the address information of the virtual bridge interface; and sending the final access response data to the client based on the virtual bridge interface

METHOD AND APPARATUS FOR ACCESSING VIRTUAL MACHINE, DEVICE AND STORAGE MEDIUM

CROSS-REFERENCE TO RELATED APPLICATION

This application claims priority to Chinese Patent Application No. 202410366177.7, filed on Mar. 27, 2024, which is hereby incorporated by reference in its entirety.

TECHNICAL FIELD

The present disclosure relates to address port translation technologies in the field of computer technologies, and in particular, to a method and an apparatus for accessing a virtual machine, a device and a storage medium.

BACKGROUND

Before network virtualization is implemented, a virtual machine network is on a physical network (such as an underlay network), that is, a virtual machine network and a host machine network of a server (such as compute node) were generally bridged together through a linux bridge (such as br0), and a virtual machine accesses an external network through a physical network interface of the br0. After network virtualization is implemented, a virtual machine network of a server (such as compute node) is an overlay network, that is, the server connects to a network node through a tunnel (such as virtual extended local area network, vxlan for short), and accesses the underlay network through the network node. Therefore, a method (such as secure shell protocol, ssh for short) of directly connecting virtual machine IP (Internet Protocol, IP for short) on the underlay network is unavailable.

In the prior art, an independent and external virtual IP (VitualIP, VIP for short) needs to be set in a physical network card as an entrance of DNAT (Destination Network Address Translation, DNAT for short), and a virtual switch (such as open virtual switch, OVS for short) is used for accessing to virtual machine.

However, a method for accessing the virtual machine in the prior art can lead to problems of wasting IP resources and high access cost.

SUMMARY

The present disclosure provides a method and an apparatus for accessing a virtual machine, a device and a storage medium.

According to a first aspect of the present disclosure, a method for accessing a virtual machine is provided, which is applied to a server, the server is deployed with a virtual switch, at least one virtual machine, a physical network interface card interface and a virtual bridge interface, the virtual bridge interface is respectively connected with the physical network interface card interface, the virtual switch, the method includes:

receiving an initial access request transmitted by the physical network interface card interface through the virtual bridge interface; where the initial access request is used to indicate access to the virtual machine, and the initial access request includes first destination address information, the first destination address information is address information of the virtual bridge interface;

translating, based on the virtual bridge interface, the first destination address information in the initial access request to second destination address information to obtain a processed access request; where the second destination address information is address information of a port of the virtual switch, and sending, based on the virtual bridge interface, the processed access request to the port of the virtual switch according to the second destination address information;

translating, based on the virtual switch, the second destination address information in the processed access request to third destination address information to obtain a final access request; where the third destination address information is address information of the virtual machine; and accessing the virtual machine indicated by the initial access request based on the third destination address information in the final access request.

According to a second aspect of the present disclosure, an apparatus for accessing a virtual machine is provided, which is applied to a server, the server is deployed with a virtual switch, at least one virtual machine, a physical network interface card interface and a virtual bridge interface, the virtual bridge interface is respectively connected with the physical network interface card interface, the virtual switch, the apparatus includes:

a receiving unit, configured to receive an initial access request transmitted by the physical network interface card interface through the virtual bridge interface; where the initial access request is used to indicate access to the virtual machine, and the initial access request includes first destination address information, the first destination address information is address information of the virtual bridge interface;

a first translation unit, configured to translate, based on the virtual bridge interface, the first destination address information in the initial access request to second destination address information to obtain a processed access request; where the second destination address information is address information of a port of the virtual switch, and send, based on the virtual bridge interface, the processed access request to the port of the virtual switch according to the second destination address information;

a second translation unit, configured to translate, based on the virtual switch, the second destination address information in the processed access request to third destination address information to obtain a final access request; where the third destination address information is address information of the virtual machine; and an accessing unit, configured to access the virtual machine indicated by the initial access request based on the third destination address information in the final access request.

According to a third aspect of the present disclosure, an electronic device is provided, including: at least one processor; and a memory communicatively connected to the at least one processor; where the memory stores instructions that can be executed by the at least one processor, and the instructions are executed by the at least one processor to enable the at least one processor to perform the method for accessing virtual machine described in the first aspect.

According to a fourth aspect of the present disclosure, a non-transitory computer-readable storage medium that stores computer instructions is provided, where the computer instructions are used to enable the computer to perform the method for accessing virtual machine described in the first aspect.

According to a fifth aspect of the present disclosure, a computer program product is provided, the computer program product includes: a computer program, the computer program is stored in a readable storage medium, at least one processor of an electronic device can read the computer program from the readable storage medium, and the at least one processor executes the computer program to enable the electronic device to perform the method for accessing virtual machine described in the first aspect.

According to the technology of the present disclosure, the problem of excessive consumption of IP resources for accessing virtual machine is solved, and the access cost is reduced.

It should be understood that the content described in this part is not intended to identify critical or significant features of embodiments of the present disclosure, nor is it intended to limit the scope of the present disclosure. Other features of the present disclosure will be made easier to understand by the following specification.

BRIEF DESCRIPTION OF DRAWINGS

The drawings are for a better understanding of the present solution and do not make a limitation on the present disclosure.

FIG. 1 is a schematic diagram according to a first embodiment of the present disclosure.

FIG. 2 is a schematic diagram according to a second embodiment of the present disclosure.

FIG. 3 is a schematic diagram according to a third embodiment of the present disclosure.

DESCRIPTION OF EMBODIMENTS

Figure 4:
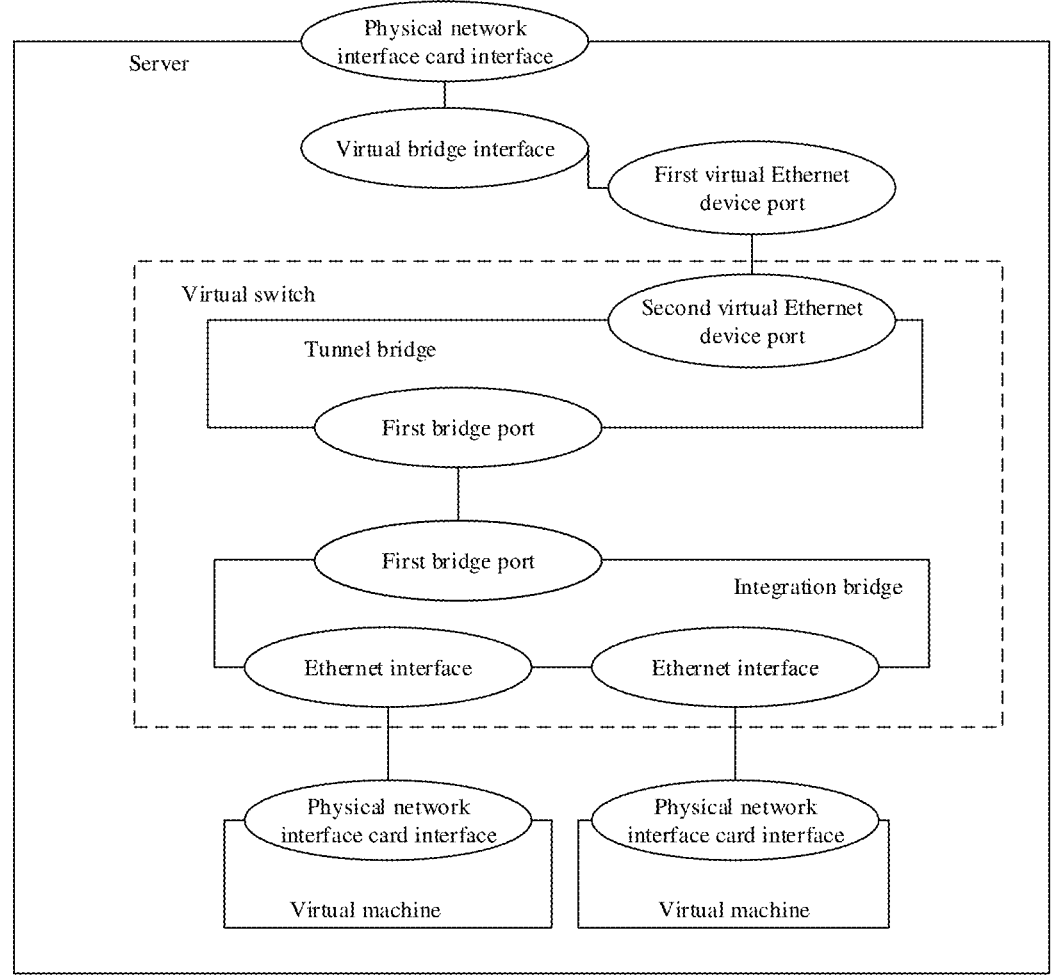
FIG. 4 is a structural schematic diagram of a server used to implement a method for accessing virtual machine of an embodiment of present disclosure.

Exemplary embodiments of the present disclosure are described below in conjunction with the accompanying drawings, which include various details of embodiments of the present disclosure for understanding and should be considered exemplary only. Therefore, ordinary persons skilled in the art should be aware that various changes and modifications can be made to the embodiments described herein without departing from the scope and spirit of the present disclosure. At the same time, for clarity and conciseness, descriptions of known functions and structures have been omitted from the following descriptions.

The present disclosure provides a method and an apparatus for accessing a virtual machine, a device and a storage medium, which is applied to the field of address port translation technologies in the field of computer technologies, so as to reduce the IP address resource consumption and access cost for accessing virtual machine.

FIG. 1 is a schematic diagram according to a first embodiment of the present disclosure. As shown in FIG. 1, a method for accessing virtual machine provided by the first embodiment of the present disclosure includes:

S101, receiving an initial access request transmitted by a physical network interface card interface through a virtual bridge interface.

An execution device of the embodiment of the present disclosure can be a server, the server is deployed with a virtual switch, at least one virtual machine, a physical network interface card interface and a virtual bridge interface, the virtual bridge interface is respectively connected with the physical network interface card interface, the virtual switch.

The virtual switch (such as OVS) is a high-quality virtual switch that supports multi-layer data forwarding. The OVS is mainly deployed on a server. Compared with traditional switches, the OVS has good programming scalability and network isolation and data forwarding functions achieved by the traditional switches. The OVS runs on every virtualized physical machine and provides remote management. The OVS provides two protocols for remote management in a virtualized environment: OpenFlow, which manages behavior of a switch through a flow table, and OVSDB (Open vSwitch Database, OVSDB for short) management protocol, which exposes port status of a switch. Where, an OpenFlow protocol can be used in a SDN (Software Defined Network, SDN for short) network to realize separation of a network forwarding plane and a control plane. Where virtual machine (VM) refers to a complete computer system, which is simulated by software, has complete hardware system functions and runs in a completely isolated environment. Anything that can be done on a physical computer can be done on a virtual machine. When creating a virtual machine on a computer, it is needed to set some of hard disks and memory capacity of the physical machine as hard disk and memory capacity of the virtual machine. Each virtual machine has its own CMOS (Complementary Metal Oxide Semiconductor, CMOS for short), hard disk, and operating system, and can be operated like a physical machine. Virtual machine can include multiple virtual bridges. Where a physical network interface card interface eth0 is an interface of the physical network interface card. The physical network interface card is used to connect the computer to the network. The physical network interface card can identify the computer by a MAC (Media Access Control, MAC for short) address and send a data packet to a correct destination. Where, a virtual bridge interface br0 connects to the physical network interface card interface eth0 and the virtual switch (such as OVS), respectively to realize the connection between the physical network interface card interface eth0 and the virtual bridge of the virtual switch.

The initial access request is used to indicate access to the virtual machine, specifically, the initial access request is sent by a client, and is transmitted by the physical network interface card interface eth0.

The initial access request includes first destination address information, which is address information of the virtual bridge interface. In an implementation, the first destination address information is address information of a component of the server to which the initial access request will be sent based on the client, in the embodiment of the present disclosure, the first destination address information is the address information of the virtual bridge interface. In an implementation, the first destination address information includes but is not limited to an IP address, a port number, and a MAC address of the virtual bridge interface.

S102, translating, based on the virtual bridge interface, the first destination address information in the initial access request to second destination address information to obtain a processed access request; where the second destination address information is address information of a port of the virtual switch, and sending, based on the virtual bridge interface, the processed access request to the port of the virtual switch according to the second destination address information.

In an implementation, the second destination address information is address information of a component of the server to which the processed access request is sent based on the virtual bridge interface, in the embodiment of the present disclosure, the second destination address information is address information of the port of the virtual switch (such as OVS). In an implementation, the second destination address information includes but is not limited to: an IP address of the port of the virtual switch, a port number of the interface, and a MAC address of the port of the virtual switch.

The IP address of the port of the virtual switch is a virtual IP address (VirtualIP, VIP for short) pre-deployed on the port of the virtual switch. In an implementation, a flow table of the virtual switch (such as OVS) can be pre-deployed and then the VIP is deployed through the flow table of the virtual switch (such as OVS). Among them, the so-called flow table can actually be regarded as an abstraction of OpenFlow's data forwarding function for a network device. In a traditional network device, data forwarding of a switch and a router need to rely on a Layer-2 MAC address forwarding table or a Layer-3 IP address routing table stored in the device. The flow table used in an OpenFlow switch is the same, but it integrates network configuration information at all levels of the network in its table entries, thus, richer rules can be used in data forwarding. Each flow table entry in an OpenFlow flow table consists of three parts: header fields for the data packet matching, counters for counting the number of matched data packet, and actions for displaying how matched data packet are processed. In an implementation, the process of deploying a VIP through the flow table of the virtual switch (such as OVS) can include: firstly, an ARP (Address Resolution Protocol, ARP for short) address resolution protocol ARP Replay is obtained through the flow table of the pre-deployed virtual switch (such as OVS). The basic function of ARP Replay is to query a MAC address of a target device through an IP address of the target device to ensure smooth communication. Secondly, if a source IP address field rp_spa is an IP address of the virtual bridge interface, and a destination IP address field arp_tpa is a VIP, a MAC address request arp request is sent. Then, the ARP address resolution protocol ARP Replay returns the MAC address of the port of the virtual switch to finish the deployment of a virtual IP address on the port of the virtual switch, that is, the virtual IP address is bound to the MAC address of the port of the virtual switch through the flow table of the virtual switch (such as OVS).

In an embodiment of the present disclosure, the process of translating the first destination address information in the initial access request to the second destination address information based on the virtual bridge interface is not restricted. In an implementation, the first destination address information in the initial access request is translated to the second destination address information according to corresponding relationship between the first destination address and the second destination address of the virtual bridge interface br0 pre-deployed on the server, specifically, the corresponding relationship between the first destination address and the second destination address of the virtual bridge interface br0 pre-deployed on the server by using IP container rules (iptables rules) of destination network address translation (DNAT). Where, DNAT is a network address translation technology, which is used to change the destination IP address and port number in the data packet. When the data packet is transmitted from an external network to an internal network, DNAT can replace the destination IP address and port number in the data packet with the corresponding IP address and port number in the internal network in order to properly deliver the data packet to an internal host. Where, the IP container iptables works according to rules, which are pre-defined conditions by a network administrator. The rules are generally defined as "If the data packet header meets such conditions, the data packet is processed in this way". The rules are stored in an information packet filtering table in a kernel space. These rules specify a source address, a destination address, a transport protocols (such as TCP, UDP, and ICMP), and service types (such as HTTP, FTP, and SMTP) respectively. When a data packet matches a rule, iptables processes the data packet according to a method defined by the rule, such as accept, reject, and drop. A main job of configuring a firewall is to add, modify, and remove these rules.

In an implementation, the IP address of the port of the virtual switch can be deployed in the virtual bridge interface br0, that is, host static route of the virtual IP address, so that the processed access request is sent to the port of the virtual switch based on the virtual bridge interface.

The embodiment does not restrict the process of sending the processed access request to the port of the virtual switch according to the second destination address information based on the virtual bridge interface, in an implementation, the processed access request can be sent to the port of the virtual switch according to the MAC address information in the second destination address information (in the embodiment of the present disclosure, according to the MAC address of the port of the virtual switch).

S103, translating, based on the virtual switch, the second destination address information in the processed access request to third destination address information to obtain a final access request.

The third destination address information is address information of the virtual machine; in an implementation, the third destination address information is address information of a component of the server to which the final access request is sent based on the virtual switch, in the embodiment of the present disclosure, the third destination address information is the address information of the virtual machine. In an implementation, the third destination address information includes but is not limited to the IP address, port number, and MAC address of the virtual machine. Where, the IP address of the virtual machine is an IP address of the virtual machine indicated by the access request, the port number of the virtual machine is a port number of the port of the virtual machine indicated by the access request, and the MAC address of the virtual machine is a MAC address of the virtual machine indicated by the access request.

In an embodiment of the present disclosure, the process of translating the second destination address information in the processed access request to the third destination address information based on the virtual switch is not limited, and in an implementation, the second destination address information in the processed access request can be translated to the third destination address information according to corresponding relationship between the second destination address and the third destination address of the virtual switch pre-deployed on the server. Specifically, the corresponding relationship between the second destination address and the third destination address of the virtual switch of the server can be deployed through the flow table of the pre-deployed virtual switch (such as OVS).

S104, accessing the virtual machine indicated by the initial access request based on the third destination address information in the final access request.

The embodiment does not restrict the process of accessing the virtual machine indicated by the initial access request based on the third destination address information in the final access request. In an implementation, the virtual machine indicated by the initial access request is accessed according to the MAC address information in the third destination address information (in the embodiment of the present disclosure, according to the MAC address of the virtual machine). In an implementation, the final access request can be sent to the virtual machine indicated by the initial access request based on the MAC address information in the third destination address information, and then access response data is generated based on the virtual machine indicated by the initial access request, and the access response data is fed back to the client that sent the initial access request.

In an embodiment of the present disclosure, the initial access request transmitted by the physical network interface card interface is received through the virtual bridge interface; the first destination address information in the initial access request is translated to the second destination address information to obtain a processed access request based on the virtual bridge interface; the second destination address information in the processed access request is translated to the third destination address information to obtain the final access request based on the virtual switch; the virtual machine indicated by the initial access request is accessed based on the third destination address information in the final access request. Where, the destination address information is translated based on the virtual bridge interface and the virtual switch of the server to complete the access to the virtual machine, which reduces occupation of IP address resources and usage of the physical network interface card, saves IP address resources and the cost of accessing the virtual machine.

In order to enable readers to have a deeper understanding of the implementation principle of the present disclosure, the embodiments shown in FIG. 1 are further refined in conjunction with the following FIG. 2 to FIG. 6.

FIG. 2 is a schematic diagram according to a second embodiment of the present disclosure. As shown in FIG. 2, a method for accessing virtual machine provided by the second embodiment of the present disclosure includes:

S201, receiving an initial access request transmitted by the physical network interface card interface through the virtual bridge interface.

An execution device of the embodiment of the present disclosure can be a server, the server is deployed with a virtual switch, at least one virtual machine, a physical network interface card interface and a virtual bridge interface, the virtual bridge interface is respectively connected with the physical network interface card interface, the virtual switch.

The initial access request is used to indicate access to the virtual machine, and the initial access request includes first destination address information, the first destination address information is address information of the virtual bridge interface. Specifically, about the specific description of this step can refer to the description in Step S101, this step will not be repeated.

In an implementation, the first destination address information includes the IP address, port number, and MAC address of the interface, where the IP address of the interface is the IP address of the virtual bridge interface, the port number of the interface is the port number of the virtual bridge interface, and the MAC address of the interface is the MAC address of the virtual bridge interface. Where the port number of the virtual bridge interface is a preset port number corresponding to the port number of the virtual host. In addition to indicating access to the virtual host, the initial access request is also used to indicate the port number of the virtual bridge interface and the port number of the virtual host.

S202, based on the virtual bridge interface, translating the IP address of the interface in the first destination address information to the IP address of the port of the virtual switch, and changing the MAC address of the interface in the first destination address information to the MAC address of the port of the virtual switch.

In an implementation, the first destination address information includes the IP address, port number, and MAC address of the interface; the second destination address information includes the IP address of the port of the virtual switch, the port number of the interface, and the MAC address of the port of the virtual switch. After the first destination address information and the second destination address information are further defined, the specific content of translating the first destination address information in the access request to the second destination address information is more clear.

Specifically, after receiving the initial access request transmitted by the physical network interface card interface through the virtual bridge interface, based on the virtual bridge interface, the IP address of the interface in the first destination address information can be translated to the IP address of the port of the virtual switch, and the MAC address of the interface in the first destination address information can be changed to the MAC address of the port of the virtual switch. Where, this process refers to the specific process of translating the first destination address information in the access request to the second destination address information after further limitation of the first destination address information and the second destination address information described above, and the access process is more specific. In an implementation, first, according to the IP container rules of destination network address translation, that is, the iptables rules of DNAT described in Step S102, the IP address of the interface in the first destination address information is translated to the IP address of the port of the virtual switch in the second address information, the port number of the interface in the first destination address information is kept unchanged. Then, according to the process described in Step S102 that pre-deploying the flow table of the virtual switch (such as OVS), and deploying the VIP by the flow table of the virtual switch (such as OVS), the MAC address of the port of the virtual switch bounded to the IP address of the port of the virtual switch is determined, and the MAC address of the interface in the first destination address information is changed to the MAC address of the port of the virtual switch in the second destination address information. Where, the IP container rules of destination network address translation are based on connection tracking (conntrack) technology. Specifically, the connection tracking technology is one of the important functions built on a Netfilter framework. Connection tracking allows a kernel to keep track of all logical network connections or sessions, thereby correlating all data packets that may make up the connection. Network address translation NAT relies on this information to translate all related data packets in the same way, and the IP container rules iptables can use this information to act as a stateful firewall.

In an implementation, the initial access request also includes first source address information, the first source address information is address information of the client that issued the initial access request; where the first source address information includes an IP address, a port number, and a MAC address of the client;

the processed access request also includes second source address information, the second source address information includes the IP address of the client, the port number of the client, and the MAC address of the interface, the MAC address of the interface is the MAC address of the virtual bridge interface. Where, here is a further limitation of the initial access request and the processed access request, on the basis of the destination address information, it also includes the source address information, which makes the description of the initial access request and the processed access request more specific.

In an implementation, the MAC address of the client in the first source address information can be changed to the MAC address of the interface based on the virtual bridge interface. Where, based on the above further limitation of the initial access request and the processed access request, while the first destination address information in the initial access request is translated to the second destination address information based on the virtual bridge interface, the first source address information in the initial access request is also performed corresponding address information translation. This process further refines the process of translating the initial access request to the processed access request.

S203, sending, based on the virtual bridge interface, the processed access request to the port of the virtual switch according to the second destination address information.

The specific description of this step can refer to the description in S102, this step will not be repeated.

In an implementation, the server is also deployed with a first virtual Ethernet device port and a second virtual Ethernet device port, the first virtual Ethernet device port is connected to the virtual bridge interface and the second virtual Ethernet device port, respectively, and the second virtual Ethernet device port is connected to the first virtual Ethernet device port and the virtual switch, respectively, where the virtual Ethernet (veth) device pair is a pair of virtual Ethernet devices, a pair of veth devices are connected together through a virtual link, they are usually used to create a network topology similar to a network bridge or tunnel, one of the devices can be regarded as a network interface of a virtual machine or container, the other device can be regarded as a network stack connected to a hostconnected to a host's network stack. Specifically, the first virtual Ethernet device port veth_br0 is the network interface of the virtual machine or container, and the second virtual Ethernet device port veth_br-tun is the network stack connected to the host. In an implementation, the IP address of the port of the virtual switch is deployed in the virtual bridge interface br0, that is, host static route of the virtual IP address, based on the virtual bridge interface, the processed access request can enter the first virtual Ethernet device port veth_br0 through the virtual bridge interface, and based on the first virtual Ethernet device port veth_br0, the processed access request is sent from the first virtual Ethernet device port veth_br0 to the second virtual Ethernet device port veth_br-tun.

In an implementation, if the first virtual Ethernet device port and the second virtual Ethernet device port are also deployed in the server, the second destination address information is address information of the second virtual Ethernet device port. That is, the address information of the port of the virtual switch is the address information of the second virtual Ethernet device port, for example: the IP address of the port of the virtual switch is the IP address information of the second virtual Ethernet device port, the MAC address of the port of the virtual switch is the MAC address of the second virtual Ethernet device port, and the port number of the interface is the port number of the second virtual Ethernet device port.

In an implementation, if the first virtual Ethernet device port and the second virtual Ethernet device port are also deployed in the server, sending, based on the virtual bridge interface, the processed access request to the port of the virtual switch according to the second destination address information includes: sending, based on the virtual bridge interface, the processed access request to the second virtual Ethernet device port through the first virtual Ethernet device port according to the second destination address information, to enable the virtual switch to receive the processed access request through the second virtual Ethernet device port.

S204, based on the virtual switch, translating the IP address of the port of the virtual switch in the second destination address information to the IP address of the virtual machine, translating the port number of the interface in the second destination address information to the port number of the virtual machine, and changing the MAC address of the port of the virtual switch in the second destination address information to the MAC address of the virtual machine.

In an implementation, the third destination address information includes the IP address, port number, and MAC address of the virtual machine. Where, after the third destination address information is further defined, the specific content of translating the second destination address information in the access request into the third destination address information is more clear.

Specifically, after sending the processed access request to the port of the virtual switch according to the second destination address information based on the virtual bridge interface, based on the virtual switch, the IP address of the port of the virtual switch in the second destination address information can be translated to the IP address of the virtual machine, the port number of the interface in the second destination address information can be translated to the port number of the virtual machine, and the MAC address of the port of the virtual switch in the second destination address information can be changed to the MAC address of the virtual machine. Where, this process refers to a specific process of translating the second destination address information in the access request to the third destination address information after further limitation of the third destination address information described above, and the access process is more specific.

In an implementation, based on the virtual switch, according to the flow table of the pre-deployed virtual switch (such as OVS), firstly, the IP address of the port of the virtual switch in the second destination address information is translated to the IP address of the virtual machine, and the port number of the interface in the second destination address information is translated to the port number of the virtual machine. Specifically, based on the virtual switch, according to the flow table entry of the flow table, if the destination IP address that matches the received data packet is the IP address of the port of the virtual switch, a destination port number is the port number of the interface, and the data packet is received by the virtual switch through the second virtual Ethernet device port, then the data packet is first forwarded to a dedicated table for destination address translation, and then the data packet is extracted from the dedicated table for destination address translation according to the flow table entry of the flow table, and the IP address of the port of the virtual switch in the second destination address information is translated into the IP address of the virtual machine, and the port number of the interface in the second destination address information is translated into the port number of the virtual machine according to a destination address translation rule NAT of the virtual switch (such as OVS). Where, the destination address translation rule (DAT) is based on the connection tracking technology. Specifically, the connection tracking technology is one of the important functions built on a Netfilter framework. Connection tracking allows a kernel to keep track of all logical network connections or sessions, thereby correlating all data packets that may make up the connection. Network address translation NAT relies on this information to translate all related data packets in the same way, and the container rules iptables can use this information to act as a stateful firewall.

In an implementation, based on the virtual switch, the MAC address of the port of the virtual switch in the second destination address information can be changed to the MAC address of the virtual machine according to the flow table of the pre-deployed virtual switch (such as OVS).

In an implementation, if based on the virtual switch, according to the flow table entry of the flow table, if the destination IP address that does not match the received data packet is the IP address of the port of the virtual switch, or the destination port number is the port number of the interface, or the data packet is received by the virtual switch through the second virtual Ethernet device port, then the corresponding data packet is discarded.

In an implementation, the final access request also includes third source address information, which includes the IP address of the client, the port number of the client, and the MAC address of the port of the virtual switch. Where, here is a further limitation of the final access request, on the basis of the destination address information, the source address information is also included, which makes the description of the final access request more specific.

In an implementation, the MAC address of the interface in the second source address information can be changed to the MAC address of the port of the virtual switch based on the virtual switch. Where, based on the above further limitation on the final access request, while the second destination address information in the processed access request is translated to the third destination address information based on the virtual switch, the second source address information in the processed access request is also performed corresponding address information translation. This process further refines the process of translating the processed access requests to final access requests.

In an implementation, the virtual switch in the server is also deployed with a tunnel bridge br-tun and an integration bridge br-int, where virtual network cards, and other virtual network devices can be connected to the integration bridge. The tunnel bridge is used for communication based on a virtual extended local area network and a routing encapsulation protocol (such as GRE) networks based on the tunnel technology. Specifically, based on the virtual switch, translating the IP address of the port of the virtual switch in the second destination address information to the IP address of the virtual machine, translating the port number of the interface in the second destination address information to the port number of the virtual machine, and changing the MAC address of the port of the virtual switch in the second destination address information to the MAC address of the virtual machine, including: based on the tunnel bridge br-tun, the IP address of the port of the virtual switch in the second destination address information is translated to the IP address of the virtual machine, the port number of the interface in the second destination address information is translated to the port number of the virtual machine, and the MAC address of the port on the virtual switch in the second destination address information is changed to the MAC address of the virtual machine.

In an implementation, the server is also deployed with the corresponding relationship between the first destination address information and the second destination address information, the corresponding relationship between the second destination address information and the third destination address information, the corresponding relationship between the first source address information and the second source address information, and the corresponding relationship between the second source address information and the third source address information. Where pre-deployed corresponding relationships can provide translation basis for address translation.

S205, sending, based on the virtual switch, the final access request to the virtual machine indicated by the initial access request according to the third destination address information.

In an implementation, if the virtual switch in the server is also deployed with the tunnel bridge br-tun and the integration bridge br-int, sending, based on the virtual switch, the final access request to the virtual machine indicated by the initial access request according to the third destination address information, including: sending, based on the tunnel bridge br-tun and integration bridge br-int, the final access request to the virtual machine indicated by the initial access request according to the third destination address information. Specifically, after based on the tunnel bridge br-tun, the IP address of the port of the virtual switch in the second destination address information is translated to the IP address of the virtual machine, the port number of the interface in the second destination address information is translated to the port number of the virtual machine, and the MAC address of the port on the virtual switch in the second destination address information is changed to the MAC address of the virtual machine, the final access request can be sent to the integration bridge br-int based on the tunnel bridge br-tun, and then the final access request can be sent to the virtual machine indicated by the initial access request based on the integration bridge br-int. In an implementation, based on the integration bridge br-int, a final access request can be sent to the virtual machine indicated by the initial access request according to the MAC address information in the third destination address information, which in the embodiment of the present disclosure can be the MAC address of the virtual machine. Where, in the process of accessing the virtual machine indicated by the initial access request based on the third destination address information in the final access request, the final access request must first be sent to the indicated virtual machine, so that the virtual machine can make access response according to the received access request.

The integration bridge br-int and tunnel bridge br-tun are connected through a first bridge port patch-int and a second bridge port patch-tun.

In an implementation, the integration bridge br-int is also deployed with an Ethernet interface and the virtual machine is also deployed with the physical network interface card interface eth0. Specifically, based on the integration bridge br-int, the final access request can be sent to the Ethernet interface according to a Normal rule, and then based on the Ethernet interface, the final access request can be sent to the virtual machine indicated by the initial access request through the physical network interface card interface eth0 deployed in the virtual machine.

S206, generating access response data based on the virtual machine indicated by the initial access request; and feeding back the access response data to the client that issued the initial access request.

After sending the final access request to the virtual machine indicated by the initial access request according to the third destination address information based on the virtual switch, the access response data can be generated based on the virtual machine indicated by the initial access request. In an implementation, service or application to which the final access request refers can be determined to obtain corresponding response data to generate the access response data according to the IP address, the port number, and the MAC address of the virtual machine in the third address information. The access response data is fed back to the client that issued the initial access request to complete the process for accessing virtual machine.

In the embodiment of the present disclosure, the initial access request transmitted by the physical network interface card interface is received through the virtual bridge interface, based on the virtual bridge interface, the IP address of the interface in the first destination address information is translated to the IP address of the port of the virtual switch, and the MAC address of the interface in the first destination address information is changed to the MAC address of the port of the virtual switch; the processed access request is sent to the port of the virtual switch according to the second destination address information based on the virtual bridge interface; based on the virtual switch, the IP address of the port of the virtual switch in the second destination address information is translated to the IP address of the virtual machine, the port number of the interface in the second destination address information is translated to the port number of the virtual machine, and the MAC address of the port of the virtual switch in the second destination address information is changed to the MAC address of the virtual machine; the final access request is sent to the virtual machine indicated by the initial access request according to the third destination address information based on the virtual switch, the access response data is generated based on the virtual machine indicated by the initial access request, and the access response data is fed back to the client that issued the initial access request. Where, the embodiment of the present disclosure provides a detailed description of the following process of translating, based on the virtual bridge interface, the first destination address information in the initial access request to second destination address information to obtain a processed access request, translating, based on the virtual switch, the second destination address information in the processed access request to third destination address information to obtain a final access request, and accessing the virtual machine indicated by the initial access request based on the third destination address information in the final access request in detail, the accurate translation of destination address information is realized, and the accuracy in accessing virtual machine is improved.

FIG. 3 is a schematic diagram according to a third embodiment of the present disclosure. As shown in FIG. 3, a methods for accessing virtual machine provided by the third embodiment of the present disclosure includes:

S301, generating initial access response data based on the virtual machine indicated by the initial access request, and sending the initial access response data to the port of the virtual switch; where the initial access response data includes fourth source address information, the fourth source address information is the address information of the virtual machine.

The description of the initial access response data can refer to the description in step S206 and will not be repeated in this step. Specifically, after generating initial access response data based on the virtual machine indicated by the initial access request, the initial access response data can be sent to the port of the virtual switch. The description of the port of the virtual switch can refer to the description in step S203 and will not be repeated in this step.

The fourth source address information includes the IP address, port number, and MAC address of the virtual machine; fifth source address information includes the IP address of the port of the virtual switch, the port number of the interface, and the MAC address of the port of the virtual switch. Where, here is a further limitation of the fourth source address information and the fifth source address information, so that the specific content of translating the fourth source address information into the fifth address information is more clear.

S302, translating, based on the virtual switch, the fourth source address information in the initial access response data to the fifth source address information to obtain the processed access response data; where the fifth source address information is the address information of port of the virtual switch; and sending the processed access response data to the virtual bridge interface based on the virtual switch.

In an implementation, translating the fourth source address information in the initial access response data to the fifth source address information to obtain the processed access response data based on virtual switch can include:

based on the virtual switch, translating the IP address of the virtual machine in the fourth source address information to the IP address of the port of the virtual switch, translating the port number of the virtual machine in the fourth source address information to the port number of the interface, and changing the MAC address of the virtual machine in the fourth source address information to the MAC address of the port of the virtual switch. Where, this process refers to the specific process of translating the fourth source address information in the access response data to the fifth source address information after further limitation of the fourth source address information and the fifth source address information described above, and the access process is more specific.

In an implementation, based on the virtual switch, according to the flow table of the pre-deployed virtual switch (such as OVS), the IP address of the virtual machine in the fourth source address information is translated to the IP address of the port of the virtual switch, and then the port number of the virtual machine in the fourth source address information is translated to the port number of the interface. Specifically, based on the virtual switch, according to the flow table entry of the flow table, if the source IP address that matches the received data packet is the IP address of the virtual machine, the source port number is the port number of the virtual machine, and the data packet is received by the virtual switch through the integration bridge br-int, then the data packet is forwarded to the dedicated table for destination address translation, and then the data packet is extracted from the dedicated table for destination address translation according to the flow table entry of the flow table, and the IP address of the virtual machine in the fourth source address information is translated to the IP address of the port of the virtual switch, and the port number of the virtual machine in the fourth source address information is translated to the port number of the interface according to network address translation NAT of the virtual switch (such as OVS). Where, the destination address translation rule NAT is based on the connection tracking technology. Specifically, the connection tracking technology is one of the important functions built on a Netfilter framework. Connection tracking allows a kernel to keep track of all logical network connections or sessions, thereby correlating all data packets that may make up the connection. Network address translation NAT relies on this information to translate all related data packets in the same way, and the container rules iptables can use this information to act as a stateful firewall.

In an implementation, based on the virtual switch, the MAC address of the virtual machine in the fourth source address information can be changed to the MAC address of the port of the virtual switch according to the flow table of the pre-deployed virtual switch (such as OVS).

In an implementation, if based on the virtual switch, according to the flow table entry of the flow table, the source IP address that does not match the received data packet is the IP address of the virtual machine, or the source port number is the port number of the virtual machine, or the data packet is received by the virtual switch through the integration bridge br-int, then based on the virtual switch, the data packet is transmitted to the network node through the virtual extended local area network tunnel vxlan tunnel deployed on the tunnel bridge br-tun, and then forwarded to the physical network (such as underlay) via the network node, and then enter to an extranet.

The initial access response data also includes fourth destination address information, the fourth destination address information is the address information of the client receiving the initial access response data; where the fourth destination address information includes the IP address of the client, the port number of the client, and the MAC address of the port of the virtual switch;

the processed access response data also includes fifth destination address information, the fifth destination address information includes the IP address of the client, the port number of the client, and the MAC address of the interface. Where, here is a further limitation of the initial access response data and the processed access response data, on the basis of the source address information, the destination address information is also included, which makes the description of the initial access response data and the processed access response data more specific.

In an implementation, before sending the processed access response data to the virtual bridge interface based on the virtual switch, it also includes: changing the MAC address of the port of the virtual switch in the fourth destination address information to the MAC address of the interface based on the virtual switch. Where, based on the above further limitation of the initial access response data and the processed access response data, while the fourth source address information in the initial access response data is translated to the fifth source address information based on the virtual bridge interface, the fourth destination address information in the initial access response data is also performed corresponding address information translation. This process further refines the process of translating the initial access response data to the processed access response data.

In an implementation, based on the virtual switch, the MAC address of the port of the virtual switch in the fourth destination address information can be changed to the MAC address of the interface according to the flow table of the pre-deployed virtual switch (such as OVS).

S303, translating the fifth source address information in the processed access response data to sixth source address information to obtain the final access response data based on the virtual bridge interface; where the sixth source address information is the address information of the virtual bridge interface; and sending the final access response data to the client based on the virtual bridge interface.

In an implementation, the sixth source address information includes the IP address, port number, and MAC address of the interface. Where, after the sixth source address information is further defined, the specific content of translating the fifth source address information in the access response data to the sixth source address information is more clear. In an implementation, translating, based on the virtual bridge interface, the fifth source address information in the processed access response data to the sixth source address information to obtain the final access response data, which can include: based on the virtual bridge interface, translating the IP address of the port of the virtual switch in the fifth source address information to the IP address of the interface, and changing the MAC address of the port of the virtual switch in the fifth source address information to the MAC address of the interface. Where, this process refers to the specific process of translating the fifth source address information in the access request to the sixth source address information after further limitation of the sixth source address information described above, and the access process is more specific. Specifically, corresponding relationship between the pre-deployed fifth source address information and the sixth source address information can be obtained first, and then based on the virtual bridge interface, according to the corresponding relationship between the pre-deployed fifth source address information and the sixth source address information, the IP address of the port of the virtual switch in the fifth source address information can be translated to the IP address of the interface, the MAC address of the port of the virtual switch in the fifth source address information can be changed to the MAC address of the interface. In an implementation, by using IP container rules of source network address translation (SDAT), that is, the iptables rules of SNAT, the corresponding relationship between the fifth source address and the sixth source address of the virtual bridge interface of the server is pre-deployed. SNAT is a network address translation technology that is used to change the source IP address and port number in the data packet. When a data packet is transmitted from the internal network to the external network, SNAT can replace the source IP address and port number in the data packet with the public IP address and port number used by the NAT device for transmission and response on the external network.

The final access response data also includes sixth destination address information, the sixth destination address information includes the IP address, the port number, and the MAC address of the client. Where here is a further limitation of the final access response data, on the basis of the source address information, the destination address information is also included to make the description of the final access response data more specific. Specifically, before sending the final access response data to the client based on the virtual bridge interface, it can also include: changing the MAC address of the interface in the fifth destination address information to the MAC address of the client based on the virtual bridge interface. Where, based on the above further limitation of the final access response data, while the fifth source address information in the processed access response data is translated to the sixth source address information based on the virtual bridge interface, the fifth destination address information in the processed access response data is also performed corresponding address information translation. This process further refines the process of translating the processed access response data to the final access response data.

In an implementation, the server is also deployed with the corresponding relationship between the fourth source address information and the fifth source address information, the corresponding relationship between the fifth source address information and the sixth source address information, the corresponding relationship between the fourth destination address information and the fifth destination address information, and the corresponding relationship between the fifth destination address information and the sixth destination address information. Where pre-deployed corresponding relationships can provide translation basis for address translation.

FIG. 4 is a structural diagram of a server used to implement a method for accessing virtual machine of an embodiment of present disclosure. The server is deployed with a virtual switch, at least one virtual machine, a physical network interface card interface and a virtual bridge interface, the virtual bridge interface is respectively connected with the physical network interface card interface, the virtual switch. Specifically, the server is also deployed with the first virtual Ethernet device port, the second virtual Ethernet device port, tunnel bridge and integration bridge, where the first virtual Ethernet device port is respectively connected to the virtual bridge interface and the second virtual Ethernet device port, where the second virtual Ethernet device port is respectively connected to the first virtual Ethernet device port and tunnel bridge, where the tunnel bridge and integration bridge are connected through the first bridge port and the second bridge port deployed thereon, respectively, where the integration bridge and virtual machine are connected through the Ethernet interface and physical network interface card interface deployed thereon, respectively.

In the embodiment of the present disclosure, the process of generating access response data based on the virtual machine indicated by the initial access request; and feeding back the access response data to the client that issued the initial access request is described in detail, the initial access response data is generated based on the virtual machine indicated by the initial access request, and the initial access response data is sent to the port of the virtual switch; where the initial access response data includes fourth source address information, the fourth source address information is the address information of the virtual machine, the fourth source address information in the initial access response data is translated to the fifth source address information to obtain the processed access response data based on virtual switch; where the fifth source address information is the address information of port of the virtual switch; and the processed access response data is sent to the virtual bridge interface based on the virtual switch, the fifth source address information in the processed access response data is translated to the sixth source address information based on the virtual bridge interface, to obtain the final access response data; where the sixth source address information is the address information of the virtual bridge interface; and sending the final access response data to the client based on the virtual bridge interface, where, by translating the fourth source address information in the initial access response data to the fifth source address information, and translating the fifth source address information in the processed access response data to the sixth source address information, the accurate translation of source address information is realized, and the accuracy on accessing virtual machine is improved.

Figure 5:
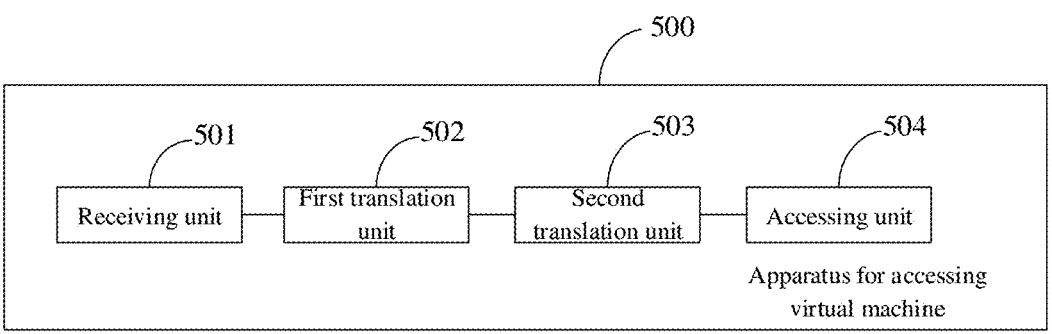
FIG. 5 is a block diagram of an apparatus for accessing virtual machine used to implement a method for accessing virtual machine of an embodiment of present disclosure.

FIG. 5 is a block diagram of an apparatus for accessing virtual machine used to implement a method for accessing virtual machine of an embodiment of present disclosure. As shown in FIG. 5, the apparatus 500 for accessing virtual machine provided by a fourth embodiment of the present disclosure is applied to a server, the server is deployed with a virtual switch, at least one virtual machine, a physical network interface card interface and a virtual bridge interface, the virtual bridge interface is respectively connected with the physical network interface card interface, the virtual switch, the apparatus includes:

a receiving unit 501, configured to receive an initial access request transmitted by the physical network interface card interface through the virtual bridge interface; where the initial access request is used to indicate access to the virtual machine, and the initial access request includes first destination address information, the first destination address information is address information of the virtual bridge interface;

a first translation unit 502, configured to translate, based on the virtual bridge interface, the first destination address information in the initial access request to second destination address information to obtain a processed access request; where the second destination address information is address information of a port of the virtual switch, and send, based on the virtual bridge interface, the processed access request to the port of the virtual switch according to the second destination address information;

a second translation unit 503, configured to translate, based on the virtual switch, the second destination address information in the processed access request to third destination address information to obtain a final access request; where the third destination address information is address information of the virtual machine;

an accessing unit 504, configured to access the virtual machine indicated by the initial access request based on the third destination address information in the final access request.

In some embodiments, the first destination address information includes the IP address, port number, and MAC address of the interface; the second destination address information includes the IP address of the port of the virtual switch, the port number of the interface, and the MAC address of the port of the virtual switch.

In some embodiments, the first translation unit 502 is specifically configured to base on the virtual bridge interface, translate the IP address of the interface in the first destination address information to the IP address of the port of the virtual switch, and change the MAC address of the interface in the first destination address information to the MAC address of the port of the virtual switch.

In some embodiments, the initial access request also includes first source address information, the first source address information is address information of the client that issued the initial access request; where the first source address includes the IP address, the port number, and the MAC address of the client. The processed access request also includes second source address information, the second source address information includes the IP address of the client, the port number of the client, and the MAC address of the interface, the MAC address of the interface is the MAC address of the virtual bridge interface.

In some embodiments, the apparatus also includes: a third translation unit, configured to change the MAC address of the client in the first source address information to the MAC address of the interface based on the virtual bridge interface.

In some embodiments, the second destination address information includes the IP address of the port of the virtual switch, the port number of the interface, and the MAC address of the port of the virtual switch; the third destination address information includes the IP address, port number, and MAC address of the virtual machine.

In some embodiments, where the second translation unit 503 is specifically configured to base on the virtual switch, translate the IP address of the port of the virtual switch in the second destination address information to the IP address of the virtual machine, translate the port number of the interface in the second destination address information to the port number of the virtual machine, and change the MAC address of the port of the virtual switch in the second destination address information to the MAC address of the virtual machine.

In some embodiments, the processed access request also includes second source address information, the second source address information includes the IP address of the client, the port number of the client, and the MAC address of the interface, the MAC address of the interface is the MAC address of the virtual bridge interface; the final access request also includes third source address information, which includes the IP address of the client, the port number of the client, and the MAC address of the port of the virtual switch.

In some embodiments, the apparatus also includes: a fourth translation unit, configured to change the MAC address of the interface in the second source address information to the MAC address of the port of the virtual switch based on the virtual switch.

In some embodiments, a first virtual Ethernet device port and a second virtual Ethernet device port are also deployed in the server, the first virtual Ethernet device port is connected to the virtual bridge interface and the second virtual Ethernet device port, respectively, where the second destination address information is address information of the second virtual Ethernet device port.

In some embodiments, where the first translation unit 502 is also specifically configured to send, based on the virtual bridge interface, the processed access request to the second virtual Ethernet device port through the first virtual Ethernet device port according to the second destination address information.

In some embodiments, the accessing unit 504 includes: a sending module, configured to send, based on the virtual switch, the final access request to the virtual machine indicated by the initial access request according to the third destination address information; a response module, configured to generate access response data based on the virtual machine indicated by the initial access request; and feedback the access response data to the client that issued the initial access request.

In some embodiments, the response module includes: a response sub-module, configured to generate initial access response data based on the virtual machine indicated by the initial access request, and send the initial access response data to the port of the virtual switch; where the initial access response data includes fourth source address information, the fourth source address information is the address information of the virtual machine;

a first translation sub-module, configured to translate, based on the virtual switch, the fourth source address information in the initial access response data to the fifth source address information to obtain the processed access response data; where the fifth source address information is the address information of the port of the virtual switch; and send the processed access response data to the virtual bridge interface based on the virtual switch;

a second translation sub-module, configured to translate, based on the virtual bridge interface, the fifth source address information in the processed access response data to the sixth source address information to obtain the final access response data; where the sixth source address information is the address information of the virtual bridge interface; and send the final access response data to the client based on the virtual bridge interface.

In some embodiments, the fourth source address information includes the IP address, port number, and MAC address of the virtual machine; the fifth source address information includes the IP address of the port of the virtual switch, the port number of the interface, and the MAC address of the port of the virtual switch.

In some embodiments, where the first translation sub-module is specifically configured to: based on the virtual switch, translate the IP address of the virtual machine in the fourth source address information to the IP address of the port of the virtual switch, translate the port number of the virtual machine in the fourth source address information to the port number of the interface, and change the MAC address of the virtual machine in the fourth source address information to the MAC address of the port of the virtual switch.

In some embodiments, where the initial access response data also includes the fourth destination address information, the fourth destination address information is the address information of the client receiving the initial access response data; where the fourth destination address information includes the IP address of the client, the port number of the client, and the MAC address of the port of the virtual switch; the processed access response data also includes the fifth destination address information, the fifth destination address information includes the IP address of the client, the port number of the client, and the MAC address of the interface In some embodiments, the response module also includes: a third translation sub-module, configured to change the MAC address of the port of the virtual switch in the fourth destination address information to the MAC address of the interface based on the virtual switch.

In some embodiments, the fifth source address information includes the IP address of the port of the virtual switch, the port number of the interface, and the MAC address of the port of the virtual switch; the sixth source address information includes the IP address, port number, and MAC address of the interface.

In some embodiments, the second translation sub-module is specifically configured to: based on the virtual bridge interface, translate the IP address of the port of the virtual switch in the fifth source address information to the IP address of the interface, and change the MAC address of the port of the virtual switch in the fifth source address information to the MAC address of the interface.

In some embodiments, where the processed access response data also includes the fifth destination address information, the fifth destination address information includes the IP address of the client, the port number of the client, and the MAC address of the interface; the final access response data also includes the sixth destination address information, the sixth destination address information includes the IP address, the port number, and the MAC address of the client.

In some embodiments, where the response module also includes: a fourth translation sub-module, configured to change the MAC address of the interface in the fifth destination address information to the MAC address of the client based on the virtual bridge interface.

In some embodiments, where the server is also deployed with the corresponding relationship between the first destination address information and the second destination address information, the corresponding relationship between the second destination address information and the third destination address information, the corresponding relationship between the first source address information and the second source address information, and the corresponding relationship between the second source address information and the third source address information.

In some embodiments, where the server is also deployed with the corresponding relationship between the fourth source address information and the fifth source address information, the corresponding relationship between the fifth source address information and the sixth source address information, the corresponding relationship between the fourth destination address information and the fifth destination address information, the corresponding relationship between the fifth destination address information and the sixth destination address information.

According to an embodiment of the present disclosure, the present disclosure also provides an electronic device and a computer program product.

According to an embodiment of the present disclosure, the present disclosure also provides a non-transitory computer-readable storage medium storing computer instructions, where the computer instructions are used to enable the computer to perform any one of the methods in FIG. 1 to FIG. 3.

According to an embodiment of the present disclosure, the present disclosure also provides a computer program product, the computer program product includes: a computer program, the computer program is stored in a readable storage medium, at least one processor of an electronic device can read the computer program from the readable storage medium, and the at least one processor executes the computer program to enable the electronic device to execute the solution provided by any of the above embodiments.

An apparatus for accessing a virtual machine provided by FIG. 5 can perform steps involved in a terminal in the above corresponding method embodiments, their implementation principle and technical effect are similar, and will not be repeated here.

According to an embodiment of the present disclosure, the present disclosure also provides an electronic device, the electronic device includes: at least one processor; and memory communicatively connected to the at least one processor; where the memory stores instructions that can be executed by the at least one processor, and the instructions are executed by the at least one processor to enable at least one processor to execute the solution provided by any one of the above embodiments.

According to an embodiment of the present disclosure, the present disclosure also provides a non-transitory computer-readable storage medium storing computer instructions, where the computer instructions are used to enable a computer to execute the solution provided by any one of the above embodiments.

According to an embodiment of the present disclosure, the present disclosure also provides a computer program product, the computer program product includes: a computer program, the computer program is stored in a readable storage medium, at least one processor of an electronic device can read the computer program from the readable storage medium, and the at least one processor executes the computer program to enable the electronic device to execute the solution provided by any one of the above embodiments.

Figure 6:
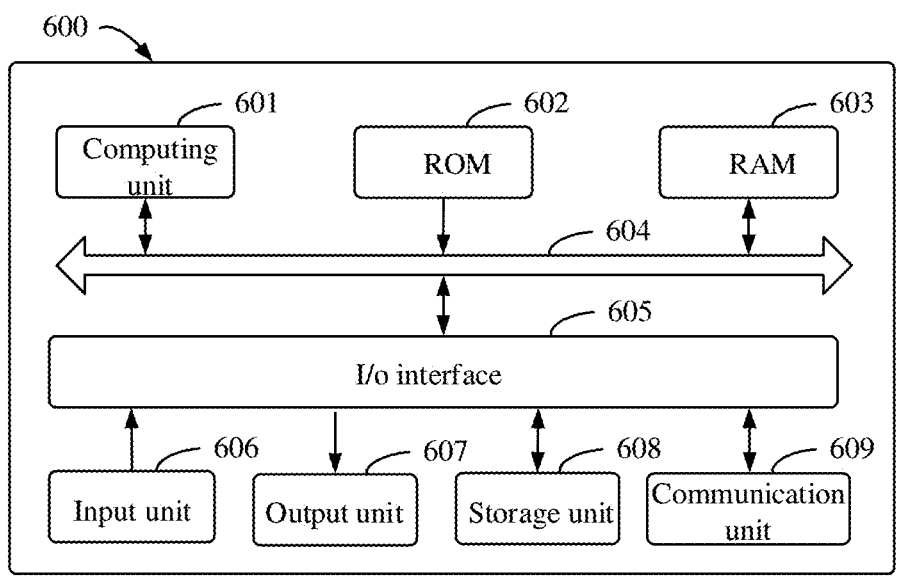
FIG. 6 is a block diagram of an electronic device used to implement a method for accessing virtual machine of an embodiment of present disclosure.

FIG. 6 is a block diagram of the electronic device used to implement a method for accessing virtual machine of the embodiment of the present disclosure. Electronic devices are intended to represent various forms of digital computers, such as laptops, desktop computers, workstations, personal digital assistants, servers, blade servers, mainframes, and other suitable computers. Electronic devices can also refer to various forms of mobile devices, such as personal digital processing, cellular phones, smart phones, wearable devices, and other similar computing apparatus. The components, their connections and relationships, and their functions shown herein are only examples and are not intended to limit the implementation of the present disclosure described herein and/or required herein.

As shown in FIG. 6, an electronic device 600 includes a computing unit 601 that can execute various appropriate actions and processes according to computer programs stored in a read-only memory (ROM) 602 or loaded from a storage unit 608 into a random access memory (RAM) 603. In RAM 603, various programs and data required for the operation of the device 600 can also be stored. The computing unit 601, ROM 602, and RAM 603 are connected to each other via a bus 604. An input/output (I/O) interface 605 is also connected to the bus 604.

Multiple components in the device 600 are connected to the I/O interface 605, including: an input unit 606, such as a keyboard, a mouse, etc.; an output unit 607, such as various types of displays, speakers, etc.; a storage unit 608, such as a disk, a CD-ROM, etc.; and a communication unit 609, such as network cards, modems, wireless communication transceivers, etc., The communication unit 609 allows device 600 to exchange information/data with other devices over computer networks such as the Internet and/or various telecommunications networks.

The computing unit 601 can be a variety of general purpose and/or specialized processing components with processing and computing capabilities. Some examples of the computing unit 601 include, but are not limited to, central processing units (CPU), graphics processing units (GPU), various specialized artificial intelligence (AI) computing chips, various computing units running machine learning model algorithms, digital signal processors (DSP), and any appropriate processors, controllers, microcontrollers, etc., The computing unit 601 performs various methods and processes described above, such as a method for accessing a virtual machine. For example, in some embodiments, the method for accessing the virtual machine may be implemented as a computer software program that is physically contained in a machine-readable medium, such as the storage unit 608. In some embodiments, part or all of the computer program can be loaded and/or installed on the device 600 via ROM 602 and/or communication unit 609. When a computer program is loaded into RAM 603 and executed by the computing unit 601, one or more steps of the method for accessing the virtual machine described above can be performed. In an implementation, in other embodiments, the computing unit 601 can be configured to perform the method for accessing the virtual machine by any other appropriate means (e.g., by means of firmware).

Various implementations of the systems and technologies described above in this disclosure can be implemented in digital electronic circuit systems, integrated circuit systems, field programmable gate arrays (FPGA), application specific integrated circuits (ASIC), application specific standard products (ASSP), system-on-a-chip systems (SOC), complex programmable logic devices (CPLD), and computer hardware, firmware, software, and/or a combination of them. These various implementations can include: implementing in, the one or more computer programs may be executed and/or interpreted on a programmable system including at least one programmable processor, the programmable processor can be a special-purpose or general-purpose programmable processor, that can receive data and instructions from a storage system, at least one input apparatus, and at least one output apparatus, and transmit data and instructions to the storage system, the at least one input apparatus, and the at least one output apparatus.

Program code for implementing the methods of the present disclosure can be written in any combination of one or more programming languages. These program codes may be provided to a processor or controller of a general-purpose computer, a special-purpose computer or other programmable data processing apparatus, so that the program code, when executed by the processor or controller, implements the functions/operations specified in the flow chart and/or block diagram. The program code can be executed entirely on a machine, partially on a machine, partially on a machine as a stand-alone software package, partially on a remote machine, or entirely on a remote machine or server.

In the context of the present disclosure, a machine readable medium can be a tangible medium that may contain or store programs for use by or in conjunction with an instruction executing system, apparatus or device. The machine readable medium may be a machine readable signal medium or a machine readable storage medium. The machine readable medium can include, but is not limited to, electronic, magnetic, optical, electromagnetic, infrared, or semiconductor systems, apparatus, or devices, or any suitable combination of the above contents. More specific examples of machine-readable storage medium may include electrical connections based on one or more wires, portable computer disks, hard disks, random access memory (RAM), read-only memory (ROM), erasable programmable read-only memory (EPROM or flash memory), optical fibers, portable compact disk read-only memory (CD-ROM), optical storage devices, magnetic storage equipment, or any suitable combination of the above contents.

In order to provide interaction with users, the systems and technologies described herein can be implemented on a computer, the computer has: a display apparatus (e.g., CRT (cathode ray tube) or LCD (liquid crystal display) monitor) for displaying information to the user; and a keyboard and pointing apparatus (for example, a mouse or trackball) through which the user can provide input to the computer. Other types of apparatus can also be used to provide interaction with the user; for example, the feedback provided to the user can be any form of sensory feedback (for example, visual feedback, auditory feedback, or haptic feedback); input from the user can be received in any form (including acoustic input, voice input, or haptic input).

The systems and technologies described herein can be implemented in a computing system (for example, as a data server) that includes back-end components, or a computing system (for example, an application server) that includes middleware components, or a computing system (for example, a user computer with a graphical user interface or a web browser, the user can interact with implementations of the system and technology described herein through the graphical user interface or the web browser) that includes front-end components, or a computing system that includes any combination of such back-end components, middleware components, or front-end components. The components of the system can be connected to each other through digital data communication in any form or medium (for example, communication networks). Examples of communication networks include: local area networks (LAN), wide area networks (WAN), and the internet.

A computer system can include a client and a server. The client and the server are generally far away from each other and usually interact over a communication network. A relationship of the client and the server is generated by computer programs that run on the corresponding computer and have a client-server relationship with each other. The server can be a cloud server, also known as cloud computing server or cloud host, which is a host product in the cloud computing service system to solve the defects of traditional physical host and VPS service ("Virtual Private Server", or "VPS" for short), which are difficult to manage and weak business scalability. The server can also be a server of a distributed system, or a server that combines block chain.

It should be understood that various forms of processes shown above can be used to reorder, add, or remove steps. For example, the steps recorded in the present disclosure may be performed in parallel, sequentially, or in different orders, so long as the results desired by the technical solution disclosed in the present disclosure are achieved, there are no limitations herein.

The above specific implementations do not constitute limitations on the protection scope of the present disclosure. It should be understood by those skilled in the art that various modifications, combinations, sub-combinations, and substitutions can be made depending on design requirements and other factors. Any modification, equivalent replacement, improvement, etc. made within the spirit and principles of the present disclosure shall be included in the protection scope of the present disclosure.

What is claimed is:

1. A method for accessing a virtual machine, applied to a server, the server is deployed with a virtual switch, at least one virtual machine, a physical network interface card interface and a virtual bridge interface, the virtual bridge interface is respectively connected with the physical network interface card interface, the virtual switch, wherein the method comprises:

receiving an initial access request transmitted by the physical network interface card interface through the virtual bridge interface; wherein the initial access request is used to indicate access to the virtual machine, and the initial access request comprises first destination address information, the first destination address information is address information of the virtual bridge interface;

translating, based on the virtual bridge interface, the first destination address information in the initial access request to second destination address information to obtain a processed access request; wherein the second destination address information is address information of a port of the virtual switch, and sending, based on the virtual bridge interface, the processed access request to the port of the virtual switch according to the second destination address information;

translating, based on the virtual switch, the second destination address information in the processed access request to third destination address information to obtain a final access request; wherein the third destination address information is address information of the virtual machine; and accessing the virtual machine indicated by the initial access request based on the third destination address information in the final access request.

2. The method according to claim 1, wherein the first destination address information comprises an IP address, a port number, and a MAC address of an interface; the second destination address information comprises an IP address of a port of a virtual switch, a port number of an interface, and a MAC address of a port of a virtual switch.

3. The method according to claim 2, wherein the translating, based on the virtual bridge interface, the first destination address information in the initial access request to the second destination address information to obtain the processed access request, comprising:

based on the virtual bridge interface, translating the IP address of the interface in the first destination address information to the IP address of the port of the virtual switch, and changing the MAC address of the interface in the first destination address information to the MAC address of the port of the virtual switch.

4. The method according to claim 1, wherein the initial access request further comprises first source address information, the first source address information is address information of a client that issued the initial access request; wherein the first source address information comprises an IP address, a port number, and a MAC address of the client;

the processed access request further comprises second source address information, the second source address information comprises the IP address of the client, the port number of the client, and the MAC address of the interface, the MAC address of the interface is a MAC address of the virtual bridge interface.

5. The method according to claim 4, before the sending, based on the virtual bridge interface, the processed access request to the port of the virtual switch according to the second destination address information, further comprising:

changing the MAC address of the client in the first source address information to the MAC address of the interface based on the virtual bridge interface.

6. The method according to claim 1, wherein the second destination address information comprises an IP address of a port of a virtual switch, a port number of an interface, and a MAC address of a port of a virtual switch; the third destination address information comprises an IP address, a port number, and a MAC address of a virtual machine.

7. The method according to claim 6, wherein the translating, based on the virtual switch, the second destination address information in the processed access request to third destination address information to obtain a final access request, comprises:

based on the virtual switch, translating the IP address of the port of the virtual switch in the second destination address information to the IP address of the virtual machine, translating the port number of the interface in the second destination address information to the port number of the virtual machine, and changing the MAC address of the port of the virtual switch in the second destination address information to the MAC address of the virtual machine.

8. The method according to claim 1, wherein the processed access request further comprises second source address information, the second source address information comprises an IP address of a client, a port number of a client, and a MAC address of an interface, the MAC address of the interface is an MAC address of a virtual bridge interface;

the final access request further comprises third source address information, the third source address information comprises an IP address of a client, the port number of the client, and a MAC address of the port of the virtual switch.

9. The method according to claim 8, before the accessing the virtual machine indicated by the initial access request based on the third destination address information in the final access request, further comprising:

changing, based on the virtual switch, the MAC address of the interface in the second source address information to the MAC address of the port of the virtual switch.

10. The method according to claim 1, wherein the server is further deployed with a first virtual Ethernet device port and a second virtual Ethernet device port, the first virtual Ethernet device port is connected to the virtual bridge interface and the second virtual Ethernet device port, respectively;

wherein the second destination address information is address information of the second virtual Ethernet device port.

11. The method according to claim 10, wherein the sending, based on the virtual bridge interface, the processed access request to the port of the virtual switch according to the second destination address information, comprising:

sending, based on the virtual bridge interface, the processed access request to the second virtual Ethernet device port through the first virtual Ethernet device port according to the second destination address information.

12. The method according to claim 1, wherein the accessing the virtual machine indicated by the initial access request based on the third destination address information in the final access request, comprising:

sending, based on the virtual switch, the final access request to the virtual machine indicated by the initial access request according to the third destination address information;

generating access response data based on the virtual machine indicated by the initial access request; and feeding back the access response data to a client that issued the initial access request.

13. The method according to claim 12, wherein the generating access response data based on the virtual machine indicated by the initial access request; and feeding back the access response data to the client that issued the initial access request, comprising:

generating initial access response data based on the virtual machine indicated by the initial access request, and sending the initial access response data to the port of the virtual switch; wherein the initial access response data comprises fourth source address information, the fourth source address information is the address information of the virtual machine;

translating, based on the virtual switch, the fourth source address information in the initial access response data to fifth source address information to obtain processed access response data; wherein the fifth source address information is the address information of the port of the virtual switch; and sending the processed access response data to the virtual bridge interface based on the virtual switch; and translating, based on the virtual bridge interface, the fifth source address information in the processed access response data to sixth source address information to obtain the final access response data; wherein the sixth source address information is the address information of the virtual bridge interface; and sending the final access response data to the client based on the virtual bridge interface.

14. The method according to claim 13, wherein the fourth source address information comprises an IP address, a port number, and a MAC address of the virtual machine; the fifth source address information comprises an IP address of the port of the virtual switch, a port number of an interface, and a MAC address of the port of the virtual switch;

wherein the initial access response data further comprises fourth destination address information, the fourth destination address information is the address information of the client receiving the initial access response data; wherein the fourth destination address information comprises the IP address of the client, the port number of the client, and the MAC address of the port of the virtual switch;

the processed access response data further comprises fifth destination address information, the fifth destination address information comprises an IP address of the client, a port number of the client, and a MAC address of the interface;

wherein the fifth source address information comprises an IP address of a port of a virtual switch, a port number of an interface, and a MAC address of a port of a virtual switch; the sixth source address information comprises an IP address, a port number, and a MAC address of an interface.

15. The method according to claim 14, wherein the translating, based on the virtual switch, the fourth source address information in the initial access response data to the fifth source address information to obtain the processed access response data, comprising:

based on the virtual switch, translating the IP address of the virtual machine in the fourth source address information to the IP address of the port of the virtual switch, translating the port number of the virtual machine in the fourth source address information to the port number of the interface, and changing the MAC address of the virtual machine in the fourth source address information to the MAC address of the port of the virtual switch.

16. The method according to claim 15, wherein before the sending the processed access response data to the virtual bridge interface based on the virtual switch, further comprising:

changing the MAC address of the port of the virtual switch in the fourth destination address information to the MAC address of the interface based on the virtual switch;

wherein before the sending the final access response data to the client based on the virtual bridge interface, further comprising:

changing a MAC address of an interface in the fifth destination address information to the MAC address of the client based on the virtual bridge interface.

17. The method according to claim 16, wherein the translating, based on the virtual bridge interface, the fifth source address information in the processed access response data to the sixth source address information to obtain the final access response data, comprising:

based on the virtual bridge interface, translating the IP address of the port of the virtual switch in the fifth source address information to the IP address of the interface, and changing the MAC address of the port of the virtual switch in the fifth source address information to the MAC address of the interface;

wherein the processed access response data further comprises fifth destination address information, the fifth destination address information comprises an IP address of a client, a port number of the client, and a MAC address of an interface;

the final access response data further comprises sixth destination address information, the sixth destination address information comprises an IP address, a port number, and a MAC address of a client.

18. The method according to claim 17, wherein the server is further deployed with corresponding relationship between the first destination address information and the second destination address information, corresponding relationship between the second destination address information and the third destination address information, corresponding relationship between first source address information and the second source address information, and corresponding relationship between the second source address information and the third source address information;

wherein the server is further deployed with corresponding relationship between the fourth source address information and the fifth source address information, corresponding relationship between the fifth source address information and the sixth source address information, corresponding relationship between fourth destination address information and fifth destination address information, and corresponding relationship between the fifth destination address information and sixth destination address information.

19. An apparatus for accessing a virtual machine, applied to a server, the server is deployed with a virtual switch, at least one virtual machine, a physical network interface card interface and a virtual bridge interface, the virtual bridge interface is respectively connected with the physical network interface card interface, the virtual switch, the apparatus comprises:

at least one processor; and a memory communicatively connected to the at least one processor; wherein the memory stores instructions that can be executed by the at least one processor, and the instructions are executed by the at least one processor to enable the at least one processor to:

receive an initial access request transmitted by the physical network interface card interface through the virtual bridge interface; wherein the initial access request is used to indicate access to the virtual machine, and the initial access request comprises first destination address information, the first destination address information is address information of the virtual bridge interface;

translate, based on the virtual bridge interface, the first destination address information in the initial access request to second destination address information to obtain a processed access request; wherein the second destination address information is address information of a port of the virtual switch, and send, based on the virtual bridge interface, the processed access request to the port of the virtual switch according to the second destination address information;

translate, based on the virtual switch, the second destination address information in the processed access request to third destination address information to obtain a final access request; wherein the third destination address information is address information of the virtual machine; and access the virtual machine indicated by the initial access request based on the third destination address information in the final access request.

20. A non-transitory computer-readable storage medium that stores computer instructions, wherein the computer instructions are used to enable the computer to:

receive an initial access request transmitted by a physical network interface card interface through a virtual bridge interface; wherein the initial access request is used to indicate access to a virtual machine, and the initial access request comprises first destination address information, the first destination address information is address information of the virtual bridge interface;

translate, based on the virtual bridge interface, the first destination address information in the initial access request to second destination address information to obtain a processed access request; wherein the second destination address information is address information of a port of a virtual switch, and send, based on the virtual bridge interface, the processed access request to the port of the virtual switch according to the second destination address information;

translate, based on the virtual switch, the second destination address information in the processed access request to third destination address information to obtain a final access request; wherein the third destination address information is address information of the virtual machine; and access the virtual machine indicated by the initial access request based on the third destination address information in the final access request.

* * * * *